United States Patent [19]

Woodford

[11] 4,260,517

[45] Apr. 7, 1981

[54] AVAILABLE AROMA OF COCAINE

[76] Inventor: Warren J. Woodford, 585 Lakeshore Dr. NE., Atlanta, Ga. 30307

[21] Appl. No.: 914,351

[22] Filed: Jun. 12, 1978

[51] Int. Cl.$^3$ ............................................. C09K 3/00
[52] U.S. Cl. ............................. 252/408; 252/522 R; 252/522 A; 424/2; 427/2
[58] Field of Search ...................... 252/522, 408, 316; 427/2; 424/2

[56] References Cited

PUBLICATIONS

CA 88; 32647z, Forensic Chemistry p. 2, 1978.
U.S. Pharmacop's XVIII, p. 137.
Amalytical Manual, Gunn—10/2/74.
Washington Star 12/4/77.

Primary Examiner—Sam Silverberg
Attorney, Agent, or Firm—Jones, Thomas & Askew

[57] ABSTRACT

A method and product for providing the aroma of cocaine to the olfactory senses by volatilizing methyl benzoate and diluting said volatilized methyl benzoate with a non-odor masking gaseous diluent, such as air, and by then contacting the olfactory senses with the diluted mixture of volatilized methyl benzoate and gaseous diluent, whereby the aroma of cocaine is perceived. The aroma of "street cocaine" may similarly be provided by volatilizing and diluting a mixture of methyl benzoate, methyl cinnamate and the dimethyl ester of truxillic acid.

12 Claims, No Drawings

AVAILABLE AROMA OF COCAINE

The present invention relates to a method and product for providing the aroma of cocaine and so called "street cocaine" to the olfactory senses using readily available, non-controlled substances.

Cocaine aroma is a brain trigger stimulus, that is, a mixture of molecules which induces a transient reoccurrence of part of the cocainization experience after a period of relative normalcy following first nasal perception of the original molecular mixture.

Olfactory conditioning by brain trigger stimulus has recently found application in law enforcement agencies. In some instances, narcotics officers are permitted to light a marijuana cigarette during their training in order to allow them to later react to the characteristic aroma of marijuana smoke. Similarly, officers may be exposed to the aroma of cocaine so as to familiarize them with its distinctive aromatic smell.

Similarly, dogs have been utilized by narcotics departments to "sniff out" marijuana or cocaine because of their ready adaptability to reflex conditioning. Training of such dogs generally involves repeated exposure of the dog to the particular aroma desired to be detected until the dog has learned to recognize the aroma. See Bulletin on Narcotics, Vol. XXVIII, No. 3, p. 41, July-September 1976.

Due to the legally controlled nature of such substances as cocaine and marijuana, it is usually not possible to freely disseminate samples of such substances to everyone who might wish to become acquainted with the aromas of these substances. Drug familiarization programs have as a result been limited by the availability of the drugs themselves.

It is therefore desirable to find alternative sources for the aroma of certain controlled substances. Efforts directed at the reproduction of the aroma of marijuana have recently been successful. However, efforts to provide the aroma of cocaine have heretofore been unsuccessful.

SUMMARY OF THE INVENTION

Generally speaking, the present invention relates to a method of providing the aroma of cocaine to the olfactory senses. More particularly, the present invention relates to a method of providing the aroma of various grades of "street cocaine" utilizing readily available, non-controlled substances. Specifically, methyl benzoate is the chemical substance which is responsible for the aroma of pure cocaine. Furthermore, a mixture of methyl benzoate, methyl cinnamate and the dimethyl ester of truxillic acid is responsible for the aroma of various other grades of cocaine.

When methyl benzoate is volatilized and then highly diluted with a gaseous non-odor masking diluent, the aroma of cocaine is provided. Similarly, when a mixture of methyl benzoate, methyl cinnamate and the dimethyl ester of truxillic acid is volatilized and then highly diluted with a gaseous non-odor masking diluent, the aroma of various grades of "street cocaine" is provided.

A unique feature of the present invention is that the aroma of cocaine is not merely imitated, but rather, the actual aroma of cocaine is provided without the use of any cocaine or cocaine related materials. Since the actual aroma of cocaine is provided by the present invention, it is possible to use the present invention to establish a chemical model for the aroma of cocaine. This chemical model may then be used in various qualitative and quantitative analytical techniques.

Due to the highly volatile nature of the associate aromatics of cocaine and cocaine related materials, the present invention is also useful for producing fragrances for perfume and cosmetics.

Accordingly, it is an object of the present invention to provide a method of providing the aroma of cocaine.

Another object of the present invention is to provide a method of providing the aroma of various grades of "street cocaine".

Yet another object of the present invention is to provide a method of providing the aroma of cocaine using readily available, non-controlled substances.

A further object of the present invention is to provide a chemical model of the aroma of cocaine.

Still another object of the present invention is to provide a method of providing the aroma of cocaine which may be used as a reference standard for qualitative and quantitative analytical techniques.

These and other objects, features and advantages of the present invention will become apparent from a review of the following detailed description of the disclosed embodiment of the invention and the appended claims.

DETAILED DESCRIPTION OF THE DISCLOSED EMBODIMENT

The present invention relates to a method of providing the aroma of cocaine in its various grades and to a method of formulating those aromas.

Cocaine is generally encountered in a variety of different grades or purities. Pharmaceutical grade cocaine is usually the purest form available having a purity generally better than 99%. However, since cocaine is also often encountered from a variety of non-pharmaceutical sources, the cocaine often has a number of associate aromatics in combination with it. Such cocaine is sometimes referred to as "street cocaine". Furthermore, "street cocaine" may originate from a variety of different geographic areas. Soil conditions, temperature and rainfall in the growing area each affect different qualities of the aroma of the "street cocaine". These factors contribute to producing a different aroma between "street cocaine" and pharmaceutical grade cocaine and, also, between "street cocaines" having different geographical origins.

It is known that acid is generally an inherent component associated with all grades of cocaine salts. Since cocaine is a base or alkaloid it is usually desirable to convert it to its more stable salt. In nature the alkaloid is stabilized by conjugation with organic acid (tannic acid) contained in the leaf. In the laboratory this is usually done by adding mineral acids, such as hydrochloric acid. The product thus obtained is the stable salt of cocaine, cocaine hydrochloride. As a result, it is found that upon contact of the cocaine with warm, humid atmospheres, the cocaine undergoes a chemical reaction. In the case of pharmaceutical grade cocaine, this chemical reaction proceeds as shown below:

$$C_{17}H_{21}NO_4 + H^+ + H_2O \rightarrow C_9H_{15}NO_3 + C_8H_8O_2 + H^+$$

Diagram I

In Diagram I above, the coca alkaloid ($C_{17}H_{21}NO_4$), which has a molecularly bonded acid function or moiety therewith, is subjected to water and heat, as would be present in a warm, moist atmosphere. The hydrolysis of the coca alkaloid gives 2-tropinecarboxylic acid ($C_9H_{11}NO_3$), which is odorless, methyl benzoate ($C_8H_8O_2$) and the acid catalyst is regenerated. It is the methyl benzoate produced in this reaction which is responsible for pharmaceutical grade cocaine's distinctive aroma.

While methyl benzoate is the substance solely responsible for the available aroma of pharmaceutical grade cocaine, it is necessary to volatilize and then dilute the methyl benzoate with a gaseous non-odor masking diluent in order to render the aroma detectable by the human nose. The threshold sensitivity for the human sense of smell is approximately $10^{-14}$g. See, Chemistry, Vol. 48, No. 8, p. 9, September 1975. This sensitivity will, of course, vary considerably from individual to individual and from substance to substance. Furthermore, the longer an individual is exposed to an aroma the less sensitive is his sense of smell for that odor. This means that progressively greater concentrations are required to maintain an individual's sensation of a a particular aroma, finally leading to olfactory fatigue and loss of response to stimulus. Nevertheless, when dealing with aromas, concentrations will almost always be less than concentrations currently usable in conventional analytical methods. Concentrations of aromas are generally in the approximate range of $10^{-14}$ to $10^{-10}$ g of the aroma-producing substance in the inspired air which releases the olfactory receptor.

The significance of this aspect of the sense of smell is that the methyl benzoate, which is a liquid at ordinary temperatures, must be volatilized and reduced to a very low concentration to be detected as an aroma. This may be done by providing an air space between the nose and the methyl benzoate oil. Due to its high vapor pressure, the methyl benzoate volatilizes spontaneously at ordinary temperatures and mixes with and is diluted by the air as the vapors travel to the nose. Thus, it will be appreciated that very low concentrations of methyl benzoate may be achieved by permitting relatively small amounts of methyl benzoate to volatilize into a relatively large volume of air.

It is specifically contemplated that substances other than air may be used to dilute the methyl benzoate. For example, the methyl benzoate may be put into an aerosol spray can pressurized with a propellant, such as carbon dioxide. When the spray is dispersed, the methyl benzoate is atomized by and diluted by the escaping carbon dioxide gas. It should be noted, however, that in most instances the methyl benzoate will be further diluted with air, since the methyl benzoate and diluent mixture will not be dispersed directly into the nose. It is specifically contemplated that the present invention may be used to calibrate analytical instrument for the comparison, detection or analysis of the aroma of cocaine. In such instances, when the aroma sensing instrument is not the nose, but is, for example, a gas chromatograph, the sole diluent may be a carrier gas, such as nitrogen or helium. When using the present invention with such analytical instruments, the degree of dilution of the methyl benzoate will depend on the sensitivity of the particular instrument being used.

It has also been found that the aroma of "street cocaine" may be provided. Although the major component of the fragrance of "street cocaine" is due to methyl benzoate, two additional fragrance "notes" are present in the aroma of "street cocaine." These two chemical substances originate by the identical process depicted in Diagram I, however, the starting materials and the end products differ.

In "street cocaine" varying quantities of cinnamoylcocaine and truxilline are usually present. When these two substances undergo the process illustrated in Diagram I, the end products are methyl cinnamate and the dimethyl ester of truxillic acid. It is these two additional aromatics plus methyl benzoate which account for the available aroma of "street cocaine."

It is not uncommon that "street cocaine" may be "cut" or contain adulterants added to the coca alkaloids to reduce the actual cocaine content of the volume of powder sold. However, it is found that adulterants and "cuts" normally found in "street cocaine", such as sugar, do not mask the available aroma of the cocaine so as to exclude positive recognition or evaluation of the aroma by a trained and experienced nose.

The proportions of the three aromatics in the aroma of "street cocaine" will often vary depending on the geographic origin of the cocaine. It is found that methyl cinnamate may be present in concentrations as high as about 20% by weight of the constituents of the aroma. Also, the dimethyl ester of truxillic acid may be present in concentrations as high as 10% by weight of the constituents of the aroma. It is found therefore that a formulation with a ratio of methyl benzoate to methyl cinnamate to the dimethyl ester of truxillic acid equal to approximately 70 to 20 to 10 corresponds to the chemical distribution of the constituents of the aroma found in a representative sample of "street cocaine".

To produce the aroma of "street cocaine" this mixture is volatilized and then diluted with a gaseous non-odor masking diluent. Again, this may be accomplished by volatilizing the mixture of aromatics and diluting the volatilized aromatics with a gaseous non-odor masking diluent, such as air, in order to achieve a concentration of the mixture of aromatics detectable by the olfactory sense. Alternately, the mixture may be diluted with a carrier gas, such as nitrogen or helium, for use in analytical instruments such as gas chromatographs and/or mass spectrometers.

It is also found that the mixture of these three aromatic compounds produces a portion of the aroma of coca leaves as well. Since cocaine and its associated alkaloids are bound within coca leaves by acidic functions, such as tannic acid, a portion of the aroma of coca leaves is produced by the method of the present invention. However, since other derivatives are also present, the present invention does not completely define the aroma of coca leaves.

It is specifically contemplated that the method of the present invention may be practiced as will be set out in detail hereinafter. It is desirable in the practice of the present invention that the aromatic compounds be contained to prevent their volatilization until such time as it is desired to provide the aroma of cocaine.

It is found that the process of microencapsulation is particularly well suited for the practice of the present invention. Microencapsulation is a process whereby a fill particle, usually a liquid droplet, is enclosed within a shell wall made of a synthetic resin or plastic. The process of microencapsulation is described in detail in U.S. Pat. No. 3,516,941, which is hereby incorporated by reference.

Specifically, it is intended that the aromatic compounds of the present invention be microencapsulated. In the case of providing the aroma of pharmaceutical grade cocaine, methyl benzoate would be microencapsulated. In the case of providing the aroma of "street cocaine" a mixture of methyl benzoate, methyl cinnamate and the dimethyl ester of truxillic acid would be microencapsulated.

After the microcapsules have been formed, they are often adhered to a substrate to form a convenient strip. These microcapsule strips have been used previously to provide samples of perfumes and other fragrant substances. The fragrance is released by scratching the microcapsule strip with the fingernail or some other similar object. The scratching breaks some of the microcapsules and releases the contents of the capsules.

In the present invention, the microcapsules would contain the volatile aromatic compounds, either methyl benzoate or a mixture of methyl benzoate, methyl cinnamate and the dimethyl ester of truxillic acid, which provide the aroma of the various grades of cocaine. When the microcapsules are broken the aromatics would be permitted to volatilize and mix with and be diluted by the surrounding air before they reach the nose for detection of the aroma.

It should also be noted that the aromatic compounds may be diluted with a non-odor masking diluent, such as mineral oil, before they are microencapsulated. In this manner, the aromatic compounds have already undergone a degree of dilution before they are volatilized and mixed with the air. This permits a lower degree of dilution by the air in order to achieve the desired concentration of the aromatic compounds and therefore permits the microcapsule strip to be held closer to the nose.

Another advantage of microencapsulation is that it permits only small portions of the aroma of cocaine to be released at a time. In this way it is less likely that an individual would become desensitized to the aroma, commonly referred to as olfactory fatigue, due to exposure to large concentrations of the aroma.

It should be understood, of course, that the foregoing relates only to preferred embodiments of the present invention and that numerous modifications or alterations may be made therein without departing from the spirit and scope of the invention as set forth in the appended claims.

What is claimed is:

1. The method of providing the aroma of "street cocaine" to the olfactory senses, which method comprises the steps of:
   volatilizing a synthetically produced mixture consisting essentially of methyl benzoate, methyl cinnamate and the dimethyl ester of truxillic acid;
   diluting said volatilized mixture of said aromatic compounds with a non-odor masking gaseous diluent; and
   contacting said olfactory senses with said volatilized and diluted mixture of aromatic compounds, whereby the aroma of "street cocaine" is perceived.

2. The method of claim 1, wherein said mixture aromatic compounds comprises by weight at least one of the following:
   up to 100% methyl benzoate;
   up to 20% methyl cinnamate; and
   up to 10% dimethyl ester of truxillic acid.

3. The method of claim 2 wherein the mixture of methyl benzoate, methyl cinnamate and the dimethyl ester of truxillic acid are in the relative ratio by weight of approximately 70 to 20 to 10 respectively.

4. The method of claims 1, 2, or 3 wherein the non-odor masking gaseous diluent is air.

5. The method of claims 1, 2, or 3 further comprising the step of diluting said aromatic compounds with a non-odor masking diluent before said aromatic compounds are volatilized.

6. The method of claims 1, 2, or 3 further comprising the steps of:
   microencapsulating said aromatic compounds; and
   breaking at least some of said microcapsules to selectively release the volatile substances contained therein.

7. The method of claim 6 further comprising the step of diluting said aromatic compounds with a non-odor masking diluent before said aromatic compounds are microencapsulated.

8. A product for providing the aroma of "street cocaine" to olfactory senses in stimulus-response relationship with a gaseous medium, said product comprising:
   a synthetically produced mixture consisting essentially of methyl benzoate, methyl cinnamate and the dimethyl ester of truxillic acid; and
   means for selectively volatilizing said mixture into said medium to provide a dilute mixture of said aromatic compounds to which said olfactory sense is responsive.

9. The product of claim 8, wherein said means for selectively volatilizing said mixture is a breakable capsule.

10. The product of claim 9, wherein said breakable capsule is a microcapsule.

11. The product of claim 8, wherein said gaseous medium is air.

12. The product of claim 8, wherein said means volatilizes a predetermined amount of said mixture of aromatic compounds to provide a mixture of one part ester and $10^9$ parts of said medium in said dilute mixture.

* * * * *